(12) United States Patent
Kråkenes et al.

(10) Patent No.: US 8,520,220 B2
(45) Date of Patent: Aug. 27, 2013

(54) APPARATUS FOR MEASURING THE DIMENSIONS OF AN OBJECT

(75) Inventors: Kjell Kråkenes, Oslo (NO); Eivind Kvedalen, Oslo (NO)

(73) Assignee: Mettler-Toledo AG, Greifensee (CH)

( * ) Notice: Subject to any disclaimer, the term of this patent is extended or adjusted under 35 U.S.C. 154(b) by 19 days.

(21) Appl. No.: 13/420,661

(22) Filed: Mar. 15, 2012

(65) Prior Publication Data

US 2012/0170053 A1    Jul. 5, 2012

Related U.S. Application Data

(63) Continuation of application No. PCT/EP2010/063576, filed on Sep. 15, 2010.

(30) Foreign Application Priority Data

Sep. 15, 2009   (EP) .................................... 09170291

(51) Int. Cl.
*G01B 11/30*    (2006.01)

(52) U.S. Cl.
USPC ........ 356/612; 356/630; 356/627; 356/237.5; 356/614; 356/442

(58) Field of Classification Search
USPC ...... 356/612, 614, 237.1, 640, 635; 250/221, 250/559.4
See application file for complete search history.

(56) References Cited

U.S. PATENT DOCUMENTS

| | | | |
|---|---|---|---|
| 4,561,778 A | 12/1985 | Kleinhuber | |
| 4,745,290 A | 5/1988 | Frankel et al. | |
| 4,825,068 A | 4/1989 | Suzuki et al. | |
| 4,855,608 A * | 8/1989 | Peterson, II | 250/559.19 |
| 5,493,112 A * | 2/1996 | Welch | 250/221 |
| 5,565,686 A * | 10/1996 | Welch | 250/559.4 |
| 5,742,068 A | 4/1998 | Dybdahl et al. | |
| 5,917,640 A | 6/1999 | Staver | |
| 6,205,243 B1 | 3/2001 | Migdal et al. | |
| 6,734,980 B1 * | 5/2004 | Brash et al. | 356/601 |
| 2003/0072011 A1 | 4/2003 | Shirley | |

FOREIGN PATENT DOCUMENTS

WO    94/15173 A1    7/1994

* cited by examiner

*Primary Examiner* — Tarifur Chowdhury
*Assistant Examiner* — Isiaka Akanbi
(74) *Attorney, Agent, or Firm* — Standley Law Group LLP

(57) ABSTRACT

In an apparatus for measuring the dimensions of an object, an opto-electronic sensor system includes an illumination device which sends light towards the object and a receiving device which receives light reflected from the object. In particular, the apparatus includes means for optically splitting the field of view of the opto-electronic sensor system into a plurality of sectors. Each of these sectors covers at least a partial view of the object under inspection from a unique viewing point. The arrangement of the optical splitting means is selected so that based on the respective field of view and the location of the actual or virtual viewing point of each sector the area on the object surface which is visible from at least one of said viewing points is maximized. The apparatus uses only one opto-electronic sensor, but obtains multi-perspective imaging of the object.

18 Claims, 5 Drawing Sheets

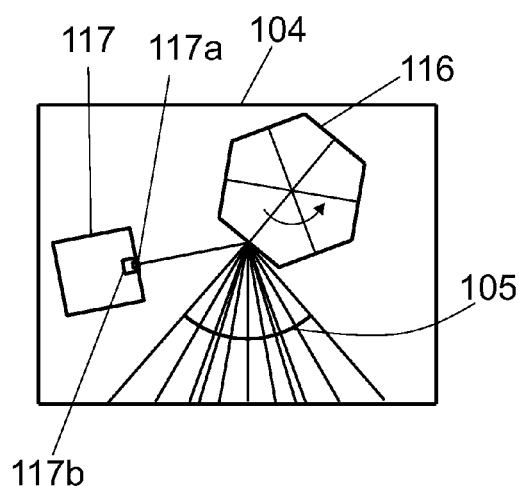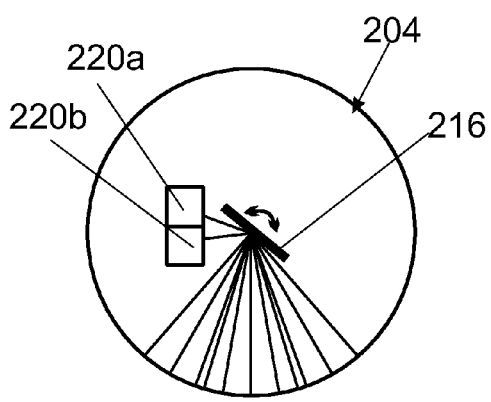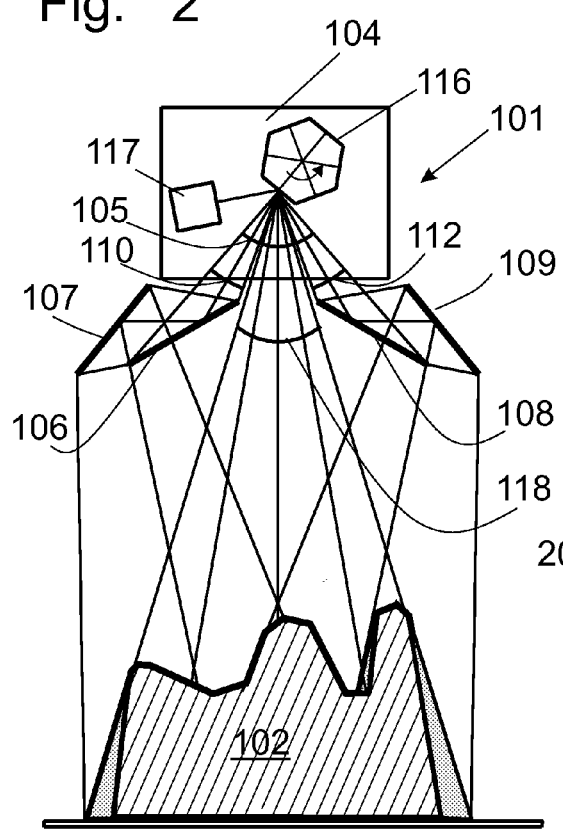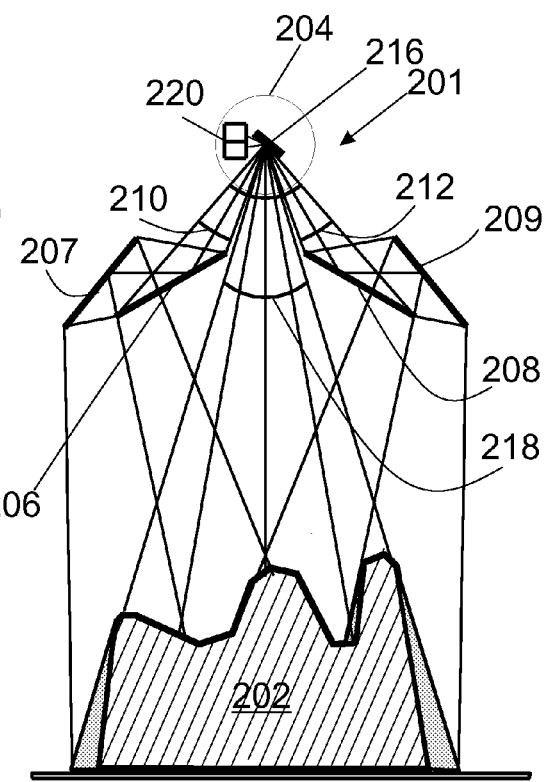

Fig. 6
Fig. 6a
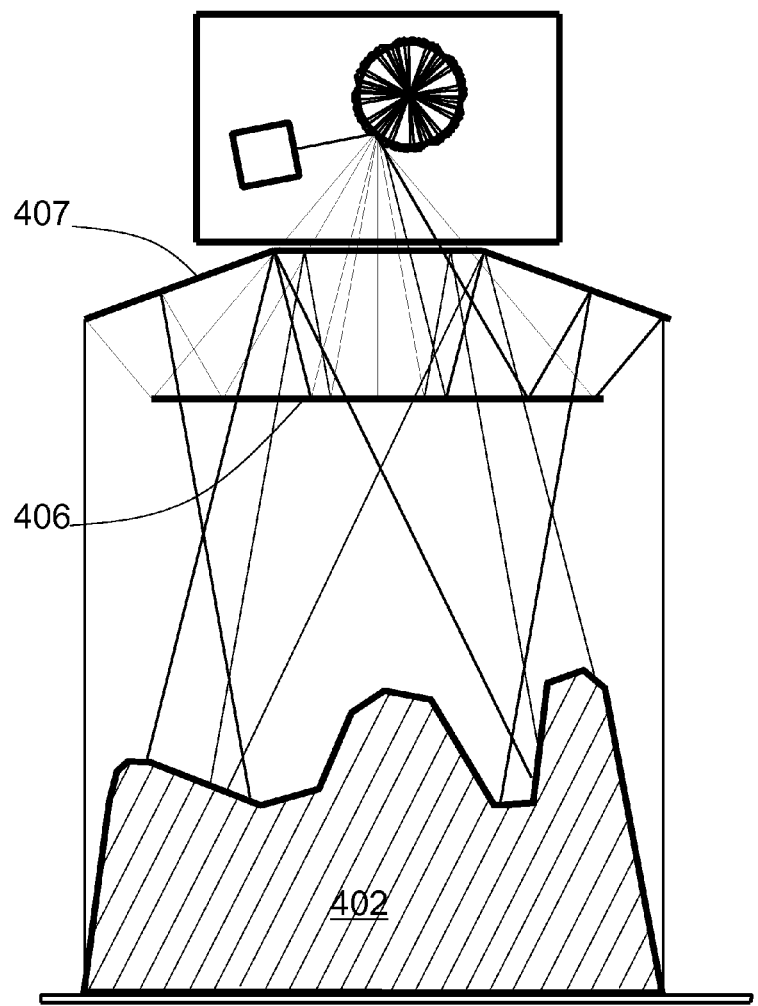
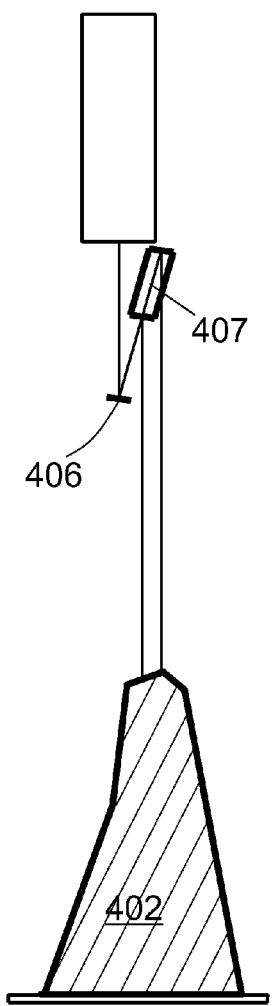

APPARATUS FOR MEASURING THE DIMENSIONS OF AN OBJECT

CROSS-REFERENCE TO RELATED APPLICATIONS

This application claims a right of priority under 35 USC §120 as a continuation of PCT/EP2010/063576, filed 15 Sep. 2010, which claims priority under 35 USC §119 from European patent application 09170291.0, filed 15 Sep. 2009. The content of each application is incorporated by reference as if fully recited herein.

TECHNICAL FIELD

The present invention relates to an apparatus for measuring the distance to at least one part of an object for determining at least one dimension of the object. The primary purpose of an apparatus of this kind is to create a three-dimensional image of an object in order to calculate the dimensions of the object. Additional or alternative uses for this kind of apparatus include detecting and decoding bar codes, address labels and/or similar markings on the object surface, and performing an inspection of the object in order to detect, identify, classify and/or measure specific features and/or surface characteristics of the object.

BACKGROUND ART

In a prior-art reference, EP 0 705 445 A1, an apparatus for measuring the dimensions of an object is disclosed. The apparatus includes means for directing a light beam towards the object, means for registering the light beams that are reflected from the object, and means for causing the light beam to sweep across the object, wherein the sweep of the light beam defines a plane that is perpendicular to a fixed reference plane. A polygonal mirror unit receives laser light and reflects it in a fan-shaped form toward a stationary angled mirror unit, which directs the light towards a double-curved stationary mirror unit which reflects the beam onto the object. The individual mirrors of the polygonal unit are adjustable. The apparatus further comprises means for relative movement between the apparatus and the object which is to be measured and means for calculating the time it takes for the light beams to travel to and from the object.

A major problem that arises in such applications is the so-called shadowing effect, where some parts on the object surface block the view of other parts on the object from the sensor's field of view, for example if the objects under inspection have an irregular shape and/or an uneven surface.

WO 94/15173 A1 discloses a sensing device for three-dimensional surface scanning based on the concept of a scanning sensor which projects two stripes of laser light and views these two stripes from two viewpoints using the viewing means. There is relative movement between the scanning sensor and the object being scanned. The scanning sensor operates on the principle of structured light triangulation. By using this method acquisition of 3D-information or distance-information of an object is based on a view from at least two different angles. The sources of structured light are usually two lasers at an angle towards each other, but may also be one laser and an optical arrangement of mirrors and beam splitters. The concept of two viewpoints may be realized by means of two CCD matrix arrays or by one CCD matrix array and four mirrors.

The apparatus described in WO 94/15173 A1 has the disadvantage of being very complex, particularly if it is to be implemented with only one laser as sending device and one CCD matrix array as receiving device, because that kind of reduction of core optical devices of a device operating on the principle of structured light triangulation would require on the one hand a laser imaging system with a beam splitter and on the other hand a further arrangement of four mirrors.

The problem to be solved by the invention is to obtain multiple views of an object by means of one opto-electronic sensor with considerably lower complexity and as a consequence lower costs compared to devices known in prior art.

SUMMARY

The problem is solved by an apparatus for measuring the dimensions of an object, comprising an opto-electronic sensor system. The opto-electronic sensor system has a laser transmitter and a scanner device, said scanner device being operable to sweep a laser-beam over the object and/or a supporting surface in a scan sector. The opto-electronic sensor system also comprises a receiving device for receiving light that has been reflected from the object, wherein the laser transmitter and the receiving device are located side by side or are arranged coaxially, with the laser scan sector overlapping the field of view. The opto-electronic sensor system further comprises shared means for optically splitting the laser scan sector and the receiving device's field of view into a plurality of sectors, wherein each of the sectors covers a partial or a full view of the object under inspection from a unique actual or virtual viewing point, wherein the arrangement of the optical splitting means is selected so that based on the respective field of view and the location of the actual or virtual viewing point of each sector, the area on the object surface which is visible from at least one of said viewing points is maximized.

The apparatus has only one opto-electronic sensor, but can be used for multi-perspective imaging of an object. In this context the term "side-by-side" is to be understood as the laser transmitter and the receiving device touching each other by their edges and/or having a maximum center-to-center distance of no more than 100 mm.

The inventive concept makes use of the so called laser range finder technique, especially the method of time-of-flight (TOF) technique, wherein the laser transmitter is modulated and the modulated light beam is sent to the object. The phase of the return light as reflected by the object is compared to the laser modulation, whereby the distance is calculated form the phase shift. As a consequence each measuring point provides complete information about the distance of the respective point by one single measurement. By scanning the laser beam over the object, distance information of the object under the scanned line is achieved. By moving the object relative to the scanned laser beam, distance information of the whole object can be collected by a point-wise or pixel-wise measurement. With an apparatus according to the invention from each actual or virtual viewing point or perspective a complete image is provided by just using one laser scanning device and one receiving device as well as a minimum of optical splitting means.

This results in a cost-efficient and simple system for scanning and/or imaging objects in particular when arranged on a supporting surface, which can be for example a conveyor or a weighing platform of a scale. In addition, the size of the opto-electronic sensor system can be kept relatively small.

The invention can be used in any application where objects are transported on a conveyor, such as inspection of products on a manufacturing line or inspection, tracking and measurement of parcels in a warehouse or freight-sorting station. Especially in the latter case multiple views or images of the objects are needed because of the great variety of sizes, shapes and surface properties of the objects to be inspected. From the multiple views, a shadow-free image can be created for different objects.

A second effect when measuring an object from different perspectives according to the invention in using TOF-technique is related to the measurement of highly glossy surfaces which for example can occur with objects wrapped in foils. Usually glossy surfaces provide images which are difficult to predict. This means besides pixels providing normal distance information of the object, some pixels may reflect too much light due to direct reflection with the respective detection means becoming saturated, whereas other pixels can show a high noise-level due to light being reflected away from the surface. Different perspectives of views of the object provide different angles of light incidence and local reflection behaviour and thereby the same point or pixel on the object provides different quality of information when viewed from different perspectives. A clear image can then be calculated by a respective software operating the opto-electronic sensor system.

The opto-electronic sensor system is arranged at a distance from the object. Preferably it can be arranged above the object to be inspected. Alternatively, if there is need to inspect the object from below, the opto-electronic sensor system may be arranged below the object to be inspected. In cases when the object is positioned on a supporting surface or on a conveyor, the inspection from below may occur through a slit therein. Even arranging the opto-electronic sensor system on one side of the object may be taken into consideration.

In a preferred embodiment, the means for optically splitting the field of view comprise at least two optical mirrors whose mirror-surfaces are correspondingly facing each other under a predefined angle so as to define different predefined sectors. The design of the mirror surfaces can be planar. Alternatively at least one of the mirror-surfaces can be of curved shape, either convexly or concavely formed. A system of at least two optical mirrors is able to redirect the optical path of a light beam or in other words to fold the light beam.

In an exemplary embodiment of the invention, the optical splitting means are arranged in a way that when illuminating an object resting for example on a support surface below the opto-electronic sensor system, side surfaces of the object which are vertical to the support surface or are to some extent slanting outward and therefore overhanging, the support surface are still seen by the opto-electronic sensor. This can for example be accomplished by arranging the optical splitting means in a way that the left hand and right hand outer light beams from the left hand virtually viewing point and the right hand virtually viewing point, respectively are pointing inwardly towards the object or optical axis on their path from the splitting means to the object and/or support surface. Left hand and right hand in this context refer to the area left or right of the opto-electronic sensor system with respect to a viewer and/or the transport direction of a conveyor transporting the objects to be inspected.

The laser transmitter and the receiving device of the apparatus when arranged coaxially with regard to each other, are sharing a common optical axis.

The illumination device and the receiving device of the apparatus may be integrated within one unit comprising a common housing, a concept which ensures a simple design and a stable arrangement.

In a specific embodiment said optical splitting means can comprise an arrangement of optical mirrors whose mirror-surfaces are correspondingly facing each other under a predefined angle and which are symmetrically arranged in pairs on both sides of the opto-electronic sensor system, providing symmetrically arranged sectors of view. Moreover, besides their symmetric arrangement, the optical mirrors can be of identical size so as to reduce production costs and facilitate the assembly process, for example the steps of mechanical mounting and optical adjusting.

The optical splitting means can comprise one first common mirror arranged at the lower end of the optical splitting means and thereby masking the central part of the field of view. As a consequence, an arrangement with only two sectors can be created, with one sector to the left and one sector to the right of the first common mirror. Preferably, the two sectors together cover the full view of the object under inspection.

In another embodiment, the optical splitting means of the apparatus comprise a first common mirror and a second common mirror for all sectors, wherein said first mirror and said second mirror are tilted out of a horizontal plane and wherein said second mirror is horizontally offset relative to said first common mirror so as to avoid masking of the field of view.

In an exemplary embodiment said sweeping of the scanner device over the object and/or the supporting surface is accomplished by a polygonal mirror. Such a scanner device is disclosed in EP 0 705 445 A1 which is considered to be incorporated herein by reference. Alternatively the scanner device can be formed by a tilting mirror and/or by a mirror moving back and forth perpendicularly to its reflecting surface. Specifically, the scanner device is designed for shared use between the laser transmitter device and the receiving device.

It is preferred that the apparatus comprises driving means for executing a relative movement between the object and the sensor system as is described in the above mentioned EP 0 705 445 A1.

In a preferred embodiment the apparatus comprises a conveyor to support the objects under inspection.

In a further design of the apparatus, the optical splitting means are arranged so that the respective fields of view of the sectors are moved upstream and/or downstream relative to each other. This is accomplished by one ore more of the mirrors of the splitting means being in a tilted arrangement at a small angle around an axis, transversal to the direction of the relative movement between the object and the sensor system. By moving the partial images upstream and/or downstream, an object can be sampled much more frequently along the direction of travel, which enables the objects under inspection to be measured more correctly at high speed. This feature can be very useful for high-speed applications.

The apparatus further comprises an electronic processing device including means for analyzing the recorded data in order to extract the essential features of the object and with means for causing the light beam to sweep over the object.

BRIEF DESCRIPTION OF THE DRAWINGS

Details of the apparatus according to the invention can be found in the following description of the embodiments illustrated in the drawings, wherein:

FIG. 2 shows a cross-sectional view of a first embodiment of the apparatus comprising a laser scanner camera system, with FIG. 2a showing the opto-electronic sensor of FIG. 2 in an enlarged detail;

FIG. 3 shows a cross-sectional view of a second embodiment of the apparatus wherein the laser transmitter and the optical receiving device are arranged side by side, with FIG. 3a shows the opto-electronic sensor of FIG. 3 in an enlarged detail;

FIG. 6 shows a fourth embodiment of the apparatus with only two mirrors, with FIG. 6a showing the optical arrangement of FIG. 6 seen from a viewing direction rotated by 90° about a vertical axis;

DETAILED DESCRIPTION OF THE DRAWINGS

Figure 1:
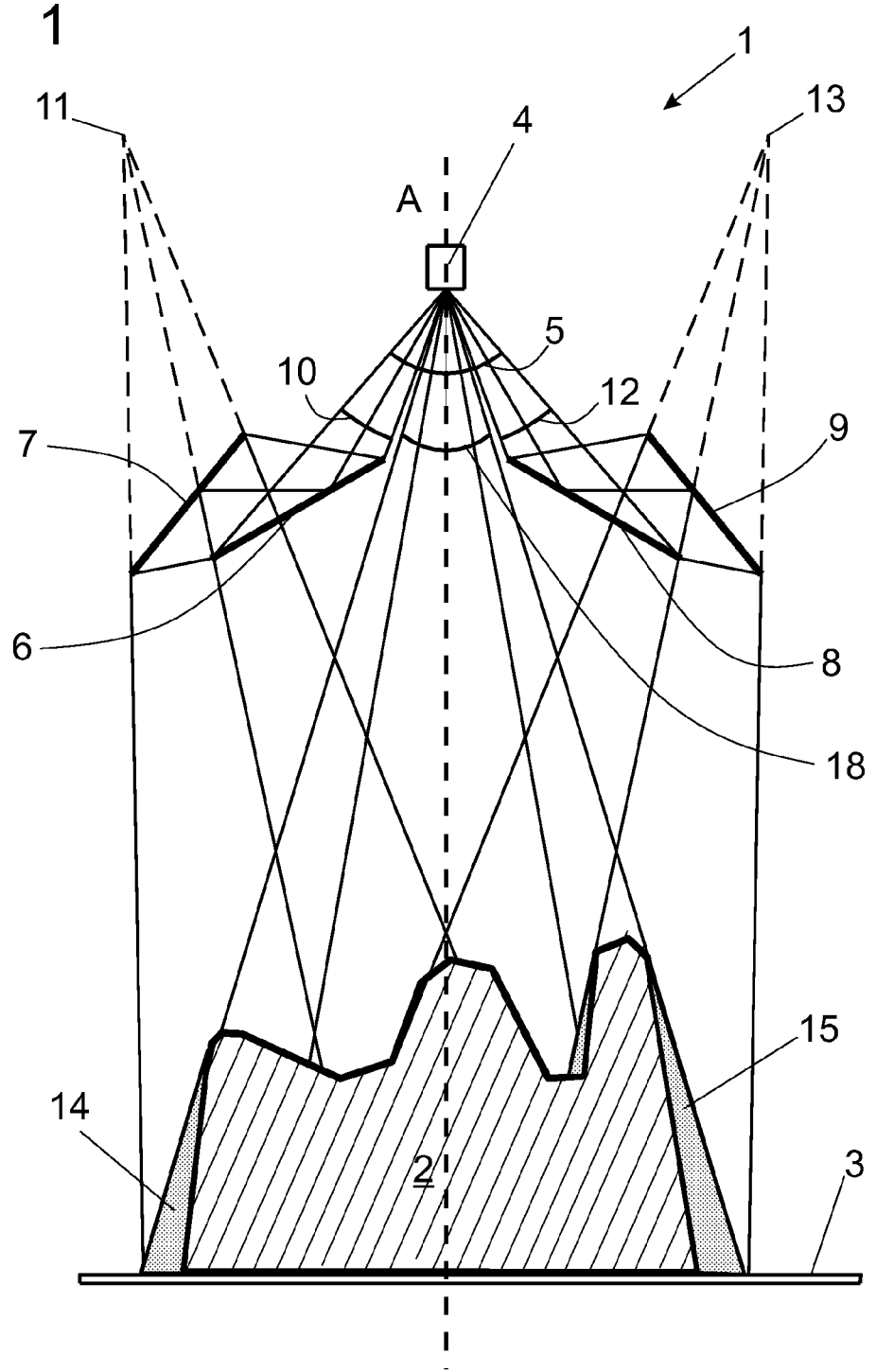
FIG. 1 shows a cross-sectional view of the general principles of the apparatus for measuring the dimensions of an object having an irregular surface, wherein the object is positioned on a support surface, for example a conveyor.

FIG. 1 represents a cross-sectional view of an apparatus 1 for measuring the dimensions of an object 2 on a support surface 3, such as a conveyor. The object 2 is imaged in a central sector by an opto-electronic sensor 4 with a full field of view as indicated by angle 5. A central part of the field of view indicated by angle 18 is defined by light directly falling on the object 2. The opto-electronic sensor 4 defines an optical axis A (dashed line) that in the configuration shown here is directed perpendicularly to surface 3. By means of a pair of mirrors 6, 7 the left sector of the field of view—indicated by angle 10—of the sensor 4 is folded so that it appears to originate from a virtual point 11 to the left of the support surface 3. Similarly, by means of the pair of mirrors 8 and 9, the rightmost sector of the field of view—as indicated by angle 12—of the sensor 4 is folded so as to appear to originate from the virtual point 13 to the right of the support surface 3. As illustrated, the areas to the left 14 and to the right 15 of the object 2 are not directly visible to the sensor 4, i.e. they are shadowed, but because of the mirrors 6, 7, 8, 9 the left area 14 is seen by way of the left sector 10 and the right area 15 is seen by way of the right sector 12.

The left pair of mirrors 6, 7 as well as the right pair of mirrors 8, 9 are arranged so that when illuminating the object 2 resting on the support surface 3 below the opto-electronic sensor system the left hand and right hand outer light beams are pointing inwardly towards the object 2 or the optical axis A, respectively on their path from the splitting means to the object 2 and/or the support surface 3.

FIG. 2 shows a first embodiment of the apparatus 101 for measuring the dimensions of an object 102 wherein the opto-electronic sensor, designed as a laser line scan camera 104 as described for example in EP 0 705 445 A1, is added. The wide-angle opto-electronic sensor is represented by a laser line scan camera 104 comprising a laser transmitter as an illumination device and a laser receiver as a receiving device. The housing of the laser line scan camera 104 contains the transmitter/receiver arrangement 117 with the laser transmitter 117a and the laser receiver 117b as well as a rotating hexagonal mirror 116 which performs the scanning sweep for the laser transmitter 117a as well as the laser receiver 117b over a wide scanning sector 105. Added externally to the laser line scan camera 104 is an arrangement of field-splitting optics with two pairs of mirrors 106, 107 and 108, 109 which are installed, respectively, on the left and on the right of the apparatus and perform the function of splitting the scan sector 105 into three subsectors 110, 112, 118 which, after reflection at the respective pairs of mirrors, appear to originate from three different scan centers.

As the rotating hexagonal mirror 116 presents a continuously changing reflection surface to the incident laser beam, the latter sweeps across the object and generates an illuminated line on the object. The illuminated line represents the intersection between the optical plane (i.e. the plane that is swept by the laser beam) and the object surface. After reflection at the object surface, the now diffuse light arrives back at the line scan camera 104 again by way of the rotating hexagonal mirror 116, and after opto-electronic conversion in the camera 104, the signal is subjected to further processing by an electronic processing device.

The light as emitted by the laser transmitter is modulated with a high frequency signal e.g. 100 MHz. Light reflected back by the object reaches the laser receiver, e.g. a photodiode, by way of the polygonal mirror 116, and the received light signal undergoes opto-electric conversion. The signal, which is characteristic of the received luminous intensity, is amplified and entered into a phase-measuring device which measures the phase difference between the light emitted by the laser transmitter 117a and the light returning to the laser receiver 117b. Based on the phase difference, the time T1 is determined which elapses from when the laser beam leaves the laser transmitter 117a, touches the surface of the object 102, and is received as reflected diffuse light by the laser receiver 117b. The time T1, in turn, is used to determine the distance traveled by the light, from which the topography of the object surface is calculated as the end result of the process. Electronic processing of the signals as received is known in the art and will therefore not be covered here.

In FIG. 2a, the laser scanner camera 104 is shown as an enlarged detail of FIG. 2, wherein the polygonal mirror 116 performs a scan as indicated by field-of-view angle 105. In this context the "field-of-view angle" is to be understood as the angle of the scanned laser beam sent to the object 2, or in other words as the scan sector, as well as the angle under which the reflected light can essentially be received by the receiving device.

The laser transmitter 117a and the laser receiver 117b are indicated only symbolically. Preferably they are arranged coaxially to each other thereby sharing a common optical axis.

FIG. 3 illustrates a second embodiment of the apparatus 201 with another optical design of the opto-electronic sensor. The laser transmitter and the receiving device are arranged side by side, essentially at the same height. Both are sharing the scanning optics, which in this embodiment are formed by a mirror tilting at a predefined frequency around an axis that is perpendicular to the plane of view. It is self-evident, that splitting means in the form of a rotating polygon mirror as shown in FIGS. 2 and 2a can also be used in a side by side arrangement as shown in FIGS. 3 and 3a and vice versa. An alternative embodiment for a scanning device can be a mirror to be moved back and forth in a direction perpendicular to its mirror surface.

FIG. 3a shows an enlarged detail of the optical arrangement of FIG. 3.

Figure 4:
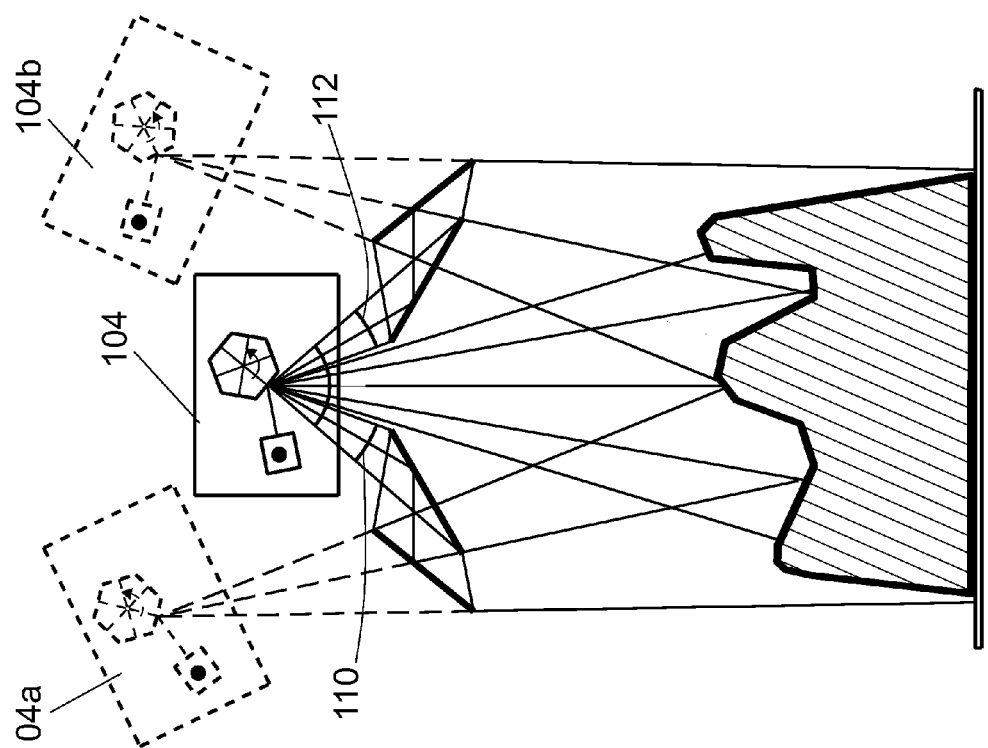
FIG. 4 shows virtual opto-electronic sensors as created by the two pairs of mirrors for a line-scan system as shown in FIG. 2.

FIG. 4, which shows the embodiment of FIG. 2, specifically illustrates how the optical arrangement creates two additional field-of-view sectors 110, 112 which are folded by the mirrors so that they appear to origin from two virtual laser scan cameras 104a, 104b. The dashed-line images show the apparent position and orientation of these virtual laser scanner cameras 104a, 104b for each of the two additional scanning sectors 110, 112.

Figure 5:
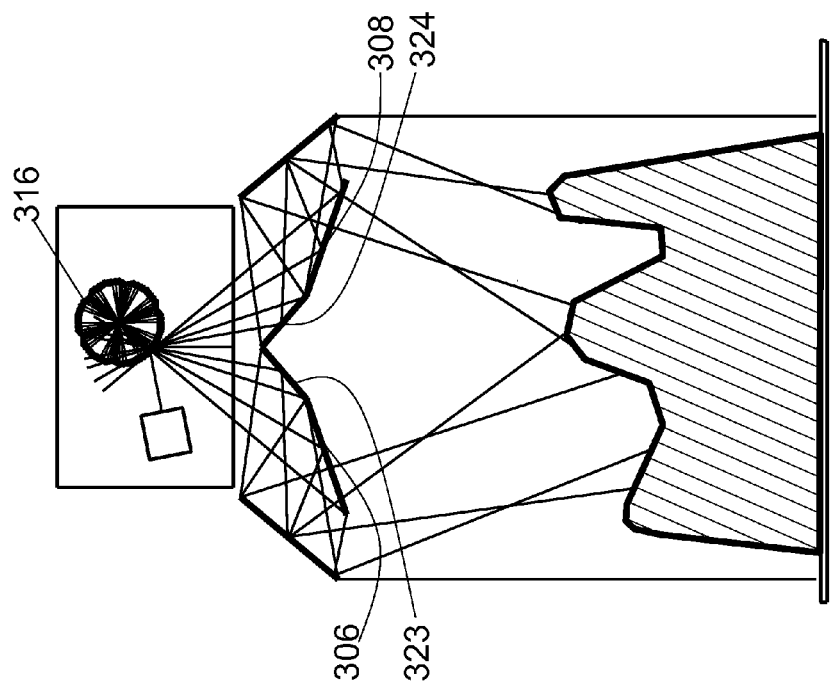
FIG. 5 shows a third embodiment of the apparatus comprising a different arrangement of mirrors whose mirror-surfaces are facing each other under two predefined angles.

A third embodiment of the opto-electronic sensor is shown in FIG. 5. Here, a mirror arrangement is used which is different from those shown in the previous FIGS. 1 to 4. With two connecting mirrors 323 and 324 deflecting the light from the central area between the mirrors 306 and 308 in the lower part of the mirror arrangement, the central field of view is removed and only a right-hand subsector and a left-hand subsector of the field of view remain operative for the measurement. Each of the sectors covers a field of view that overlaps at least part of the other one, whereby the whole width of the object can be scanned and thereby recorded.

In addition, FIG. 5 shows that the polygonal mirror 316 is rotated at high speed, so that a line scan is performed with a high frequency between 100-1000 Hz. Due to the modulation of the laser beam in the MHz regime, each data point provides between 100 to 1000 pulses to be collected and subsequently integrated.

FIG. 6 shows a fourth embodiment of the inventive apparatus with one common lower mirror 406 and one common upper mirror 407 for all three sectors. The advantage of this over the previously described arrangements is that all of the three sectors are wider, so that a larger part of the image is seen by each of them. In this way, objects with a more complex surface contour can be inspected and local shadowing effects can still be avoided.

To the right of FIG. 6, the same setup is shown in a side view in FIG. 6a. This side view illustrates the arrangement of two mirrors 406, 407 with a tilt that places the upper mirror 407 out of a plane that is perpendicular to the optical plane (i.e. a plane that is perpendicular to a fixed reference plane, such as the plane of the support surface). Without this tilt, the lower mirror 406 would block the view to the object 402. Due to the tilted mirror arrangement and the resulting offset of the upper mirror 407, no masking takes place, so that the path is free for the illumination beams to reach the object and for the reflected light to return to the laser receiver. It has to be pointed out that a tilted mirror arrangement as shown in FIG. 6a can also be used for the embodiments shown in FIGS. 1 to 5.

Figure 7:
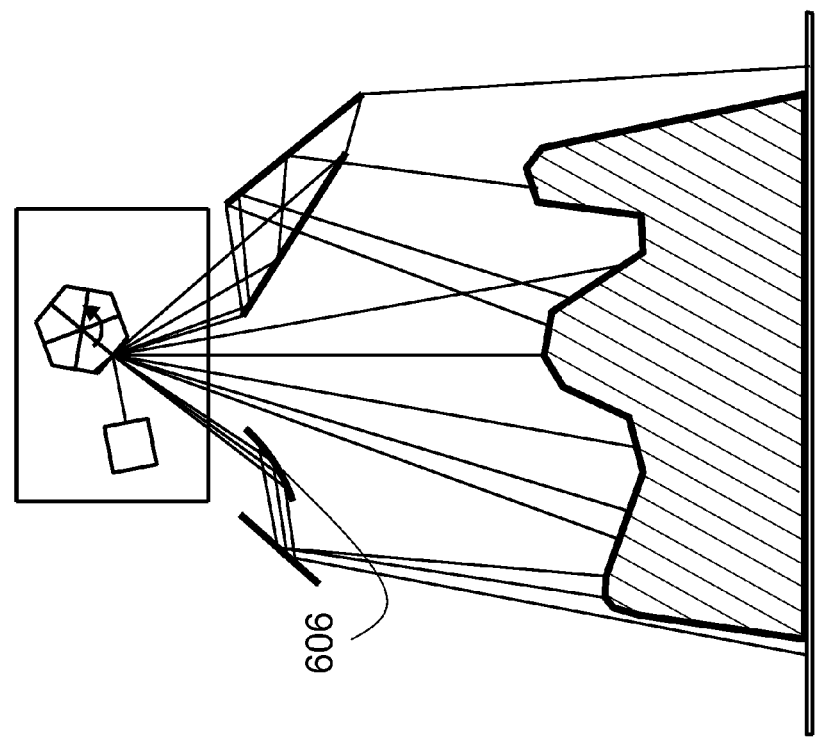
FIG. 7 shows a fifth embodiment of the apparatus wherein the mirrors are different from each other in size and arrangement, thereby providing different-sized fields of view for different sectors.

A symmetric arrangement of the pairs of mirrors whose mirror-surfaces are correspondingly facing each other under a predefined angle is not mandatory, as is illustrated by an alternative, asymmetric arrangement in FIG. 7. As a result of an asymmetric construction and/or arrangement of mirror pairs 506, 507 and 508, 509 the lateral field-of-view sectors on each side of the central field of view sector will be different from each other. In addition, the central sector can likewise be asymmetric due to asymmetric masking by the right- and left-hand pair of mirrors due to their different geometries.

Figure 8:
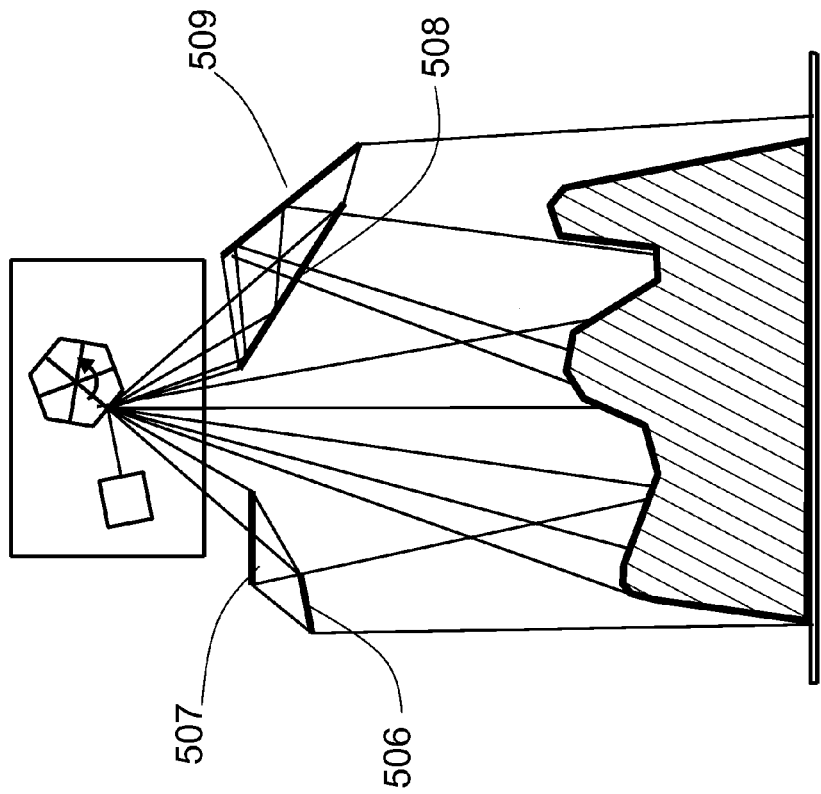
FIG. 8 shows a sixth embodiment of the apparatus wherein one of the mirrors has a concave-shaped surface of reflection.

Also, there is no absolute requirement for the one or more mirrors to be configured as planar mirrors. Arrangements are conceivable where one or more mirrors have a curved surface, as illustrated by the concave mirror 606 in FIG. 8. Likewise, one or more concave mirrors may be used. The use of curved mirrors may also be advantageous in systems where a wide field of view needs to be provided under narrow space limitations.

The invention has been described and illustrated through examples of preferred embodiments. However, individuals of ordinary professional skill in the art will be enabled by the present disclosure to realize further embodiments and/or combinations thereof falling likewise within the scope of this invention.

What is claimed is:

1. An apparatus for measuring the dimensions of an object having a surface, comprising:
   an opto-electronic sensor system, comprising:
      an illumination device comprising a laser transmitter and a scanner device, the scanner device arranged to sweep a laser-beam from the transmitter over the object in a laser scan sector;
      a device for receiving light that has been reflected from the object, the receiving device having a field of view, such that the laser transmitter and the receiving device are located with the laser scan sector overlapping the field of view; and
      a means for optically splitting the laser scan sector and the field of view into a plurality of sectors, such that each sector defines a unique viewing point, either actual or virtual, from which at least a partial view of the object is obtained, the optical splitting means arranged for shared use by the illumination device and the receiving device, in order to maximize an area of the object surface that is visible from at least one of the viewing points; and
   an electronic processing device, communicated to the opto-electronic sensor system and comprising:
      means for calculating the time the light beams take to travel to and from the object; and
      means for causing the scanner device to sweep the laser beam over the object.

2. The apparatus of claim 1, wherein:
the optical splitting means comprises at least two optical mirrors, each optical mirror having at least one mirror-surface that faces a corresponding mirror surface of at least one other optical mirror at a predefined angle.

3. The apparatus of claim 2, wherein:
at least one of the mirror surfaces is planar.

4. The apparatus of claim 3, further comprising:
a surface for supporting the object, arranged below the opto-electronic sensor system such that the optical splitting means directs light beams from the illumination device towards opposing sides of the object as the light beams travel from the optical splitting means towards the object.

5. The apparatus of claim 1, wherein:
the illumination device and the receiving device are arranged coaxially and share a common optical axis.

6. The apparatus of claim 1, wherein:
the illumination device and the receiving device are integrated within a common housing.

7. The apparatus of claim 1, wherein:
the optical splitting means comprises pairs of optical mirrors, symmetrically arranged on each side of the opto-electronic sensor system.

8. The apparatus of claim 1, wherein:
the optical splitting means comprises at least one first common mirror, arranged at a lower end of the optical splitting means, to mask a central part of the field of view.

9. The apparatus of claim 1, wherein:
the optical splitting means comprises a first common mirror and a second common mirror for all sectors, wherein each of the common mirrors are tilted and the second common mirror is offset horizontally offset relative to the first common mirror, avoiding masking of the field of view.

10. The apparatus of claim 1, wherein:
the scanner device comprises a polygonal mirror, arranged for shared use between the illumination device and the receiving device.

11. The apparatus of claim 1, wherein:
the scanner device comprises a scanning mirror, arranged for shared use between the illumination device and the receiving device, the mirror adapted to move in at least one of a tilting and a back-and-forth manner.

12. The apparatus of claim 1, further comprising:
a driver for moving the opto-electronic sensor system relative to the object.

13. The apparatus of claim 4, comprising:
a conveyor for supporting the object.

14. The apparatus of claim 13, wherein:
the optical splitting means are tilted around an axis transverse to the conveyor relative to each other, so that the respective fields of view of the sectors are moved relative to each other along the direction of travel of the conveyor, increasing the line scan frequency in the direction of travel of the conveyor.

15. The apparatus of claim 1, further comprising:
a surface for supporting the object, arranged below the opto-electronic sensor system such that the optical splitting means directs light beams from the illumination device towards opposing sides of the object as the light beams travel from the optical splitting means towards the object.

16. The apparatus of claim 1, comprising:
a conveyor for supporting the object.

17. The apparatus of claim 16, wherein:
the optical splitting means are tilted around an axis transverse to the conveyor relative to each other, so that the respective fields of view of the sectors are moved relative to each other along the direction of travel of the conveyor, increasing the line scan frequency in the direction of travel of the conveyor.

18. An apparatus for obtaining "time of flight" distance data from an object having a surface, comprising:
an opto-electronic sensor system, comprising:
an illumination device comprising a laser transmitter and a scanner device, the scanner device arranged to sweep a laser-beam from the transmitter over the object in a laser scan sector;
a device for receiving light that has been reflected from the object, the receiving device having a field of view, such that the laser transmitter and the receiving device are located with the laser scan sector overlapping the field of view; and
a means for optically splitting the laser scan sector and the field of view into a plurality of sectors, such that each sector defines a unique viewing point, either actual or virtual, from which at least a partial view of the object is obtained, the optical splitting means arranged for shared use by the illumination device and the receiving device, in order to maximize an area of the object surface that is visible from at least one of the viewing points.

* * * * *